United States Patent
Dawes et al.

(10) Patent No.: US 7,155,936 B2
(45) Date of Patent: Jan. 2, 2007

(54) DOPED SILICA GLASS ARTICLES AND METHODS OF FORMING DOPED SILICA GLASS BOULES AND ARTICLES

(75) Inventors: Steven B. Dawes, Corning, NY (US); Richard M. Fiacco, Corning, NY (US); Kenneth E. Hrdina, Horseheads, NY (US); Michael H. Wasilewski, Corning, NY (US)

(73) Assignee: Corning Incorporated, Corning, NY (US)

( * ) Notice: Subject to any disclaimer, the term of this patent is extended or adjusted under 35 U.S.C. 154(b) by 615 days.

(21) Appl. No.: 10/638,004

(22) Filed: Aug. 8, 2003

(65) Prior Publication Data

US 2005/0032622 A1  Feb. 10, 2005

(51) Int. Cl.
C03B 21/00 (2006.01)
C03B 23/04 (2006.01)

(52) U.S. Cl. .................. 65/64; 65/63; 65/102
(58) Field of Classification Search .................. 65/63, 65/64, 102
See application file for complete search history.

(56) References Cited

U.S. PATENT DOCUMENTS

| 4,612,023 | A | 9/1986 | Kreutzer et al. | |
|---|---|---|---|---|
| 4,789,389 | A | 12/1988 | Schermerhorn et al. | |
| 4,940,675 | A | 7/1990 | Bohlayer et al. | |
| 5,154,744 | A | 10/1992 | Blackwell et al. | |
| 5,443,607 | A | 8/1995 | Englisch et al. | |
| 6,209,357 | B1 | 4/2001 | Bhandarkar et al. | |
| 6,415,630 | B1 | 7/2002 | Coriand et al. | |
| 6,553,789 | B1 | 4/2003 | Martin et al. | |
| 6,829,908 | B1 * | 12/2004 | Bowden et al. | 65/17.2 |
| 6,832,493 | B1 * | 12/2004 | Bowden et al. | 65/17.3 |
| 7,053,017 | B1 * | 5/2006 | Hrdina et al. | 501/54 |
| 2002/0026810 | A1 | 3/2002 | Clasen et al. | |
| 2003/0159464 | A1 * | 8/2003 | Bowden et al. | 65/17.2 |
| 2003/0159465 | A1 * | 8/2003 | Bowden et al. | 65/17.3 |
| 2003/0159466 | A1 * | 8/2003 | Bowden et al. | 65/17.6 |
| 2003/0226377 | A1 * | 12/2003 | Barrett et al. | 65/17.4 |
| 2004/0027555 | A1 * | 2/2004 | Hrdina et al. | 356/33 |
| 2004/0045318 | A1 * | 3/2004 | Hrdina et al. | 65/17.2 |

FOREIGN PATENT DOCUMENTS

| WO | WO02/6647 A1 | 4/2002 |
|---|---|---|
| WO | WO02/32616 A1 | 4/2002 |
| WO | WO02/32622 | 4/2002 |
| WO | WO03/057633 A1 | 7/2003 |

OTHER PUBLICATIONS

Hrdina et al. "Measuring and Tailoring CTE within ULE® Glass", in *Microlithography 2003*, Proceedings of SPIE, vol. 5037.
Stulen et al. "Extreme Ultraviolet Lithography", IEEE Journal of Quantum Electronics, vol. 35, No. 5, May 1999, pp. 694-699.
Mazurin et al. "Crystallization of Silica and Titanium Oxide-Silica Corning Glasses (Codes 7940 and 7941)", Journal of Non-Crystalline Solids 18 (1975), pp. 1-9.
Presentation entitled "EUV Lithography NGL Technology Review", given at NGL Workshop, Chicago, Illinois, Jun. 9, 1990.

* cited by examiner

Primary Examiner—J. A. Lorengo
Assistant Examiner—Elizabeth A. Bolden
(74) Attorney, Agent, or Firm—Walter M. Douglas; James V. Suggs

(57) ABSTRACT

The present invention provides doped titania-doped silica glass articles having low thermal expansions and low variations in thermal expansion. According to one embodiment of the invention, a titania-doped silica glass article has a titania content of between about 5 wt % and about 9 wt %; a coefficient of thermal expansion of between about −30 ppb/° C. and about +30 ppb/° C. at a temperature between 15° C. and 30° C.; and a variation in coefficient of thermal expansion of less than about 5 ppb/° C. at a temperature between 15° C. and 30° C.

19 Claims, 2 Drawing Sheets

DOPED SILICA GLASS ARTICLES AND METHODS OF FORMING DOPED SILICA GLASS BOULES AND ARTICLES

BACKGROUND OF THE INVENTION

1. Field of the Invention

The present invention relates generally to methods of forming glass articles, and more specifically to methods of forming titania-doped silica glass articles suitable for use in extreme ultraviolet lithography applications.

2. Technical Background

The desire for faster, more powerful integrated circuits has led to rapid development of advanced ultraviolet photolithographic methods. The performance of an integrated circuit increases as the feature size decreases, since a decrease in feature size allows more circuitry to be put on a chip of a given size, and reduces the power needed for operation. The feature sizes obtainable in a photolithographic process depend on the wavelength of radiation used in the exposure step; shorter wavelengths enable smaller feature sizes. As such, there has been a trend toward shorter wavelengths in photolithographic processes. Currently, photolithography systems based on wavelengths as low as 193 nm and 157 nm are being developed for commercial use.

In order to further decrease the minimum feature size obtainable in photolithographic processes, it has been suggested to use extreme ultraviolet (EUV) radiation, for example, having a wavelength of about 13 nm. The use of EUV radiation in photolithography, while greatly reducing feature size, forces a radical departure in design from currently used photolithographic apparati. First, no currently practical condensed materials are sufficiently transparent to EUV radiation to be used as windows, lenses or photomasks. As such, any manipulation of the radiation must be performed using reflection. Mirrors constructed from alternating layers of molybdenum and silicon deposited on low thermal expansion substrates have been used as reflecting focusing mirrors, collimators, and photomasks in EUV apparati.

Titania-doped silica glass is conventionally used as the low thermal expansion substrate in EUV lithography mirrors. In one conventional method, high purity titania-doped silica glasses are formed by deposition of titania-doped silica soot formed by flame hydrolysis of silicon- and titanium-containing precursors (e.g., octamethylcyclotetrasiloxane and titanium isopropoxide). The soot is deposited in a revolving collection cup in a refractory furnace at a temperature high enough to consolidate the soot into a glass body. The amount of titania is adjusted so that the glass body has a coefficient of thermal expansion of about 0 ppb/° C. at a desired operating temperature. Titania-doped silica made using this method tends to have striae formed therein. Striae are periodic inhomogeneities in the glass which adversely effect many properties of the glass. For example, the striae cause an inhomogeneity in thermal expansion in the glass, causing reflective optics made therefrom to have less than optimal thermal properties. The striae can also impact the surface finishing of the glass, making it difficult to form the extremely smooth surfaces needed in EUV lithography elements. The striae also cause optical inhomogeneities, which make the glass unsuitable for use in many optical transmission elements (e.g., lenses, windows, prisms).

It would be advantageous to provide new methods for manufacturing a titania-doped silica glass having a low thermal expansion, a high homogeneity, good optical properties and a precisely controlled composition.

SUMMARY OF THE INVENTION

One embodiment of the present invention relates to a method of producing a titania-doped silica glass boule, the method including the steps of providing a substantially homogeneous titania-doped silica glass rod, the titania-doped silica glass rod having a titania content of between about 1 and about 10 wt %, the titania-doped silica glass rod being substantially non-porous; feeding the titania-doped silica glass rod into a furnace, the furnace having a glass collection surface therein, wherein the titania-doped silica glass rod is softened in the furnace to form a softened titania-doped silica glass, and the softened titania-doped silica glass is deposited on the collection surface, thereby forming a softened titania-doped silica glass mass; and cooling the titania-doped silica glass mass to produce the titania-doped silica glass boule.

Another embodiment of the present invention relates to a titania-doped silica glass article having a titania content of between about 5 wt % and about 9 wt %; a coefficient of thermal expansion of between about −30 ppb/° C. and about +30 ppb/° C. at a temperature between 15° C. and 30° C.; and a variation in coefficient of thermal expansion of less than about 5 ppb/° C. at a temperature between 15° C. and 30° C.

The devices and methods of the present invention result in a number of advantages over prior art devices and methods. For example, the present method allows the skilled artisan to form titania-doped silica rods using a method chosen for convenience and its ability to deliver highly pure, highly homogeneous materials, and not for its ability to form a large titania-doped silica boule. The silica-doped titania rods are then softened and collected in a furnace to form a boule of a desirably large size. The present invention provides large bodies of highly pure, highly homogeneous titania-doped silica materials having low levels of striae.

Additional features and advantages of the invention will be set forth in the detailed description which follows, and in part will be readily apparent to those skilled in the art from the description or recognized by practicing the invention as described in the written description and claims hereof, as well as in the appended drawings.

It is to be understood that both the foregoing general description and the following detailed description are merely exemplary of the invention, and are intended to provide an overview or framework for understanding the nature and character of the invention as it is claimed.

The accompanying drawings are included to provide a further understanding of the invention, and are incorporated in and constitute a part of this specification. The drawings are not necessarily to scale, and sizes of various elements may be distorted for clarity. The drawings illustrate one or more embodiment(s) of the invention, and together with the description serve to explain the principles and operation of the invention.

DETAILED DESCRIPTION OF THE PREFERRED EMBODIMENTS

Figure 1:
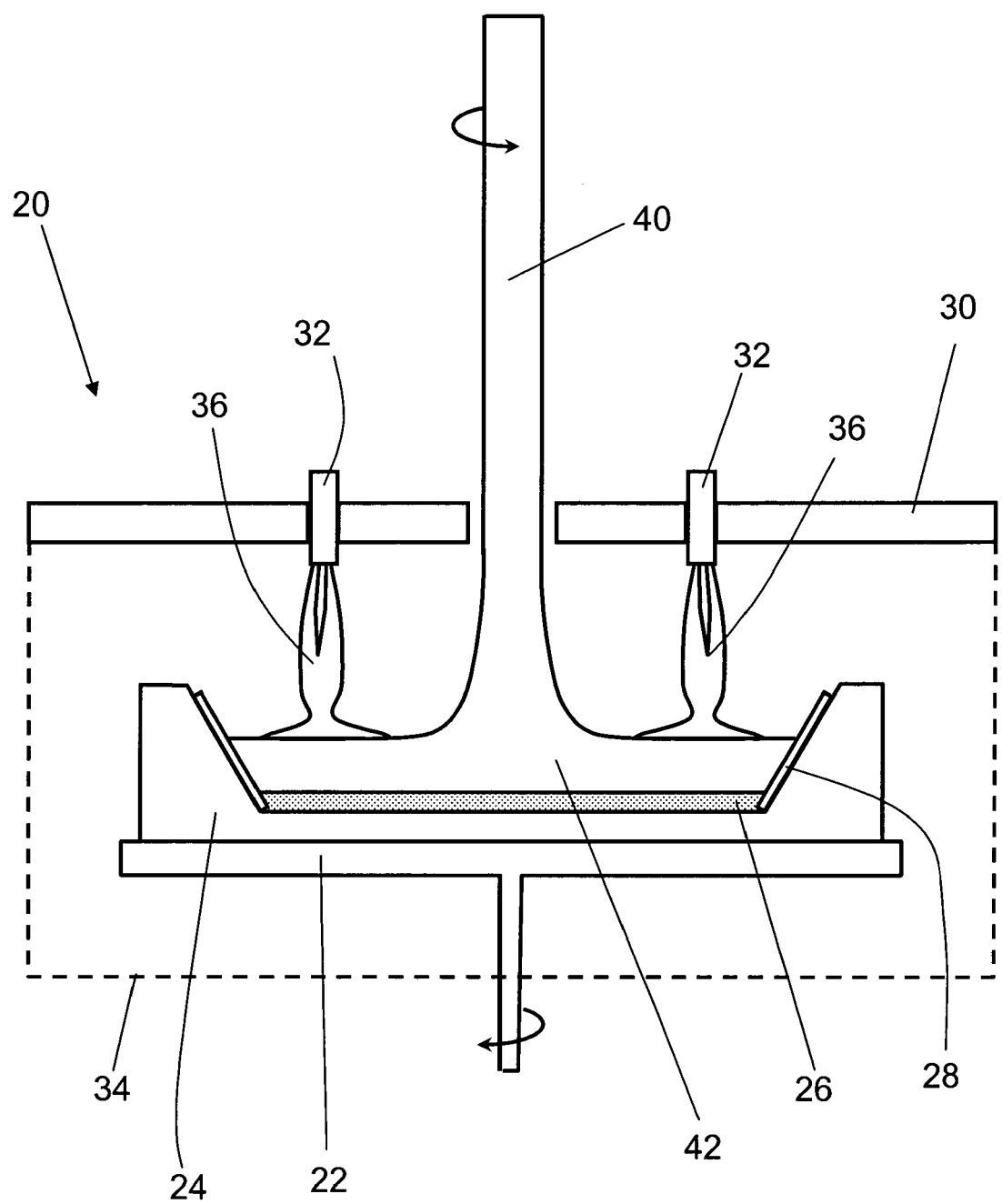
FIG. 1 is a schematic view of a titania-doped silca rod being fed into a furnace.

One embodiment of the present invention relates to a method of producing a titania-doped silica glass boule. First, a substantially homogeneous titania-doped silica glass rod having a titania content of between about 1 wt % and about 10 wt % is provided. The titania-doped silica glass rod is fed into a furnace having a glass collection surface therein. In the furnace, the titania-doped silica glass rod is softened to form a softened titania-doped silica glass, which is deposited on the melting surface to form a softened titania-doped silica glass mass. The softened titania-doped silica glass mass is cooled to produce the titania-doped silica glass boule.

The titania-doped silica glass rod is substantially homogeneous, and is desirably substantially non-porous. It desirably has a low level of striae; for example, the index difference between striae ($\Delta n_{striae}$) is desirably less than 100 ppm, and the stress difference between striae ($\Delta stress_{striae}$) is desirably less than 0.15 MPa. The titania-doped glass rod also desirably has a high overall homogeneity; for example, the index homogeneity is desirably less than 200 ppm.

If a low thermal expansion glass material is required, the titania-doped silica glass rod should have a titania content of between about 5 wt % and about 9 wt %, and a coefficient of thermal expansion of between about −30 ppb/° C. and about +30 ppb/° C. at a temperature between 15° C. and 30° C. Desirably, the coefficient of thermal expansion of the titania-doped silica glass rod is between −10 ppb/° C. and about +10 ppb/° C. at a temperature between 15° C. and 30° C. More desirably, the coefficient of thermal expansion of the titania-doped silica glass rod is between −5 ppb/° C. and about +5 ppb/° C. at a temperature between 15° C. and 30° C. In certain embodiments of the invention, the coefficient of thermal expansion of the titania-doped silica glass rod is between −2 ppb/° C. and about +2 ppb/° C. at a temperature between 15° C. and 30° C. The skilled artisan will adjust the relative amounts of titania and silica in the titania-doped silica to achieve a desired coefficient of thermal expansion. For near-zero coefficient of thermal expansion at room temperature, a titanium content of between about 6.8 wt % and about 7.8 wt % is desirable.

The titania-doped silica rod may be formed using a number of suitable methods. Powder-based methods are especially desirable, as highly pure titania-doped silica powders may be made by a variety of methods (e.g., flame hydrolysis, chemical vapor deposition, sol-gel processing). When using a titania-doped silica powder, it is desirable that the powder have a mean particle diameter between about 20 mn and about 1000 nm in order to minimize seed (void) formation during consolidation. Likewise, the powder desirably has a surface area of between about 10 m²/g and about 200 m²/g. More desirably, the powder has a mean particle size of about 20 nm to about 200 nm; and a surface area of between about 15 m²/g and about 50 m²/g. A suitable flame hydrolysis method for making a titania-doped silica powder is described in U.S. patent application Ser. No. 10/378,390, which is hereby incorporated by reference herein in its entirety.

For example, one suitable powder-based method is a sol-gel process including the steps of forming a titania-doped silica sol; causing the sol to gel, thereby forming a titania-doped silica gel; drying the titania doped silica gel to form a porous titania-doped silica body; and heating the titania-doped silica body to form the titania-doped silica glass rod. The titania-doped silica sol may be formed by dispersing a titania-doped silica powder (e.g., a titania-doped silica soot made by flame hydrolysis or chemical vapor deposition) in a liquid phase (e.g., water). A suitable sol-gel process is described in more detail in the Example, below. Sol-gel methods in which the sol is formed by solution phase hydrolysis and condensation of silanes and titanates may also be used in the present invention.

Other powder-based methods, such as slip casting, extrusion/firing, isostatic pressing, and hot pressing may be used to form the titania-doped silica glass rods. For example, one suitable method, described in U.S. patent application Ser. No. 10/085,838, which is hereby incorporated herein by reference, includes the steps of providing a titania-doped silica glass soot; spray-drying the soot to form an agglomerate; dry-pressing the agglomerate to form a porous titania-doped silica body; and heating the titania-doped silica body to form the titania-doped silica glass rod. Other suitable methods for forming the titania-doped silica glass rods are described in U.S. patent application Ser. Nos. 10/378,390; 10/086,231; and 10/086,238, each of which is hereby incorporated herein by reference.

When making a titania-doped silica glass rod using a sol-gel- or powder-based method, a porous titania-doped silica body is usually formed as an intermediate. It is generally necessary to heat the porous titania-doped silica body to dry it and to consolidate it into a substantially homogeneous rod. The drying process will typically include a relatively low temperature (e.g., 400° C. to 1000° C.) treatment to remove adsorbed water and any organic compounds present in the body. After the low temperature heat treatment, a higher temperature (e.g., 1300° C. to 1550° C.) treatment is performed to consolidate the porous body into a homogenous glass rod. The consolidation is desirably performed in an atmosphere of helium, which has high permeability in titania-doped silica. Any seeds (voids) in the glass rod can be removed by heating to the softening point of the glass in a non-helium containing vacuum. The helium will readily diffuse out of the seed, but no other gas will readily permeate the glass to diffuse into the seed. Hence, a vacuum will be left in the seed, which will collapse due to capillary forces when the glass approaches its softening temperature. Porous titania-doped silica bodies having a median pore size of less than 20 microns are desirable for use in the present invention, as they are easier to consolidate into virtually seed-free rods. More desirably, the porous titania-doped silica body has a median pore size of less than 1 micron.

Once the substantially homogeneous titania-doped silica glass rod is provided, it is fed into a furnace to be softened and collected into a mass. An example of this step is shown in schematic view in FIG. 1. In FIG. 1, furnace 20 includes support table 22, which is desirably configured to be rotatable. A refractory cup 24 made from a refractory material (e.g., zirconia) sits on top of the table. The shape of the cup is selected to provide a desired shape to the boule. A bait material 26 (e.g., high purity silica sand) prevents adhesion of the titania-doped silica glass to surface of the bottom the refractory cup, while glass liners 28 prevent adhesion to the sides of the cup. The bait material 26 and glass liners 28 provide a collection surface for the softened titania-doped silica glass. Furnace 20 includes refractory crown 30, which helps maintain the temperature inside the furnace, and holds burners 32 in place. Burners 32 may be, for example, methane/oxygen burners, and are configured to direct flames 36 toward the refractory cup. The sidewalls and bottom of the furnace are indicated in the schematic view of FIG. 1 by dashed line 34.

In use, a titania-doped silica glass rod 40 is fed into the furnace, and is softened to form a softened titania-doped silica glass, which is deposited on the collection surface, forming a softened titania-doped silica glass mass 42. Desirably, the temperature in the furnace is in the range of 1600° C. to 2100° C. More desirably, the temperature in the furnace is in the range of 1700° C. to 2000° C. In certain especially desirable embodiments of the invention, the temperature in the furnace is hot enough to melt the titania-doped silica glass rod 40, so that the melted glass may flow readily onto the collection surface. The titania-doped silica rod is lowered into the furnace at a controlled rate selected by the skilled artisan to provide a reasonable rate of deposition while allowing the titania-doped silica rod to soften sufficiently. Desirably, the furnace has a non-reducing atmosphere to avoid formation of reduced titanium species such as Ti(III) in the glass. Furnace atmospheres having a partial pressure of oxygen greater than $10^{-4}$ atmospheres are generally sufficiently non-reducing. Suitable furnaces are described in U.S. Pat. Nos. 5,043,002; 5,152,819; and 5,970,751, each of which is hereby incorporated herein by reference in its entirety.

Figure 2:
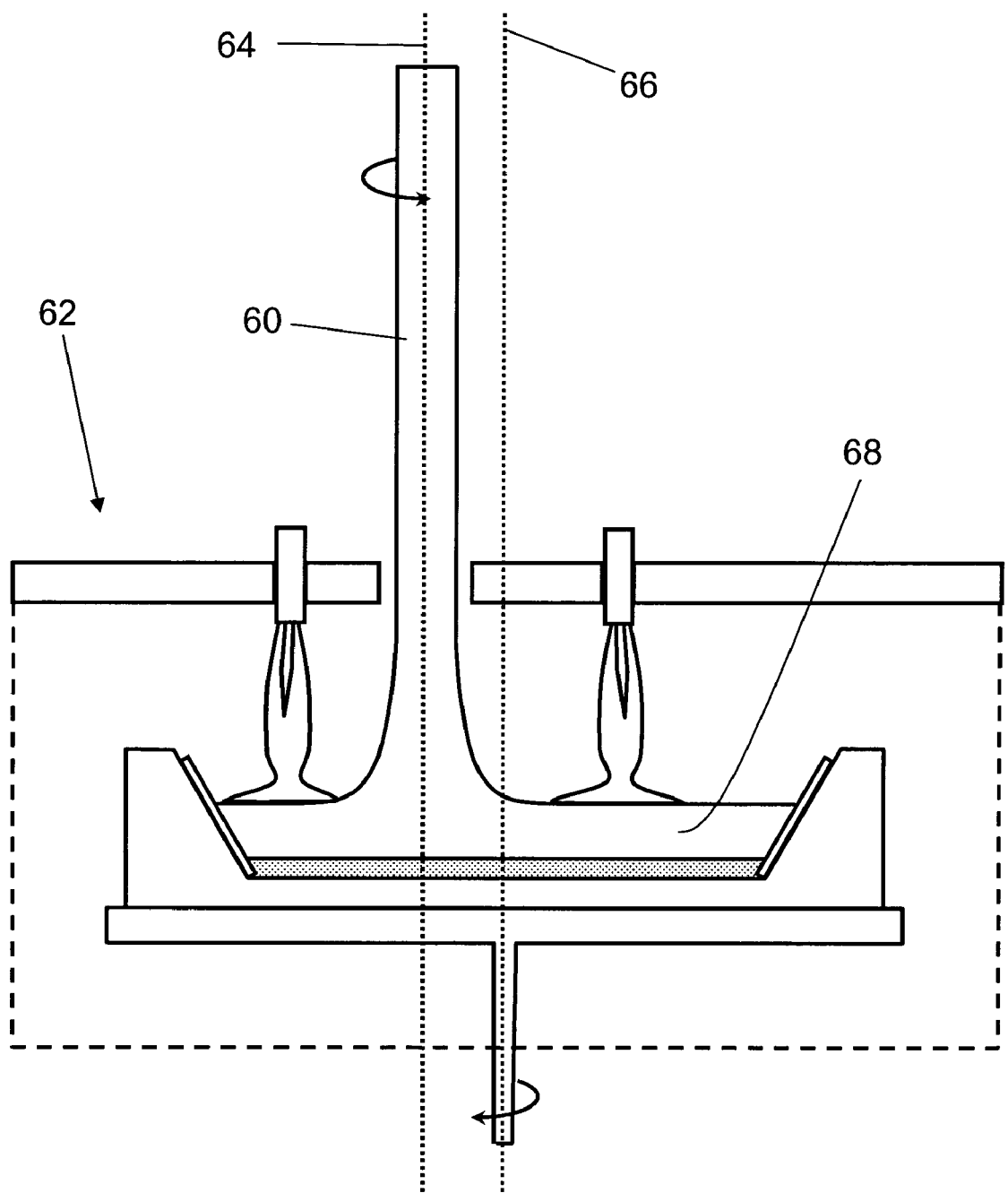
FIG. 2 is a schematic view of a titania-doped silica rod being fed into a furnace along an axis offset from the axis of rotation of the collection surface.

The titania-doped silica glass mass 42 takes the shape of the inside of the refractory cup 24. Advantageously, the refractory cup dimensions can be much larger than the diameter of the titania-doped silica glass rod. For example, the refractory cup can have an inner diameter more than three times greater than that of the titania-doped silica glass rod. In certain embodiments of the invention, the refractory cup has an inner diameter more than six times greater than that of the titania-doped silica glass rod. In the present invention, large homogeneous titania-doped silica boules may be made using much smaller titania-doped silica rods as a feedstock; as such, processes which are limited in size (e.g., powder-based methods, sol-gel-based methods) may be used to provide highly pure and highly homogeneous feedstock, which is then transformed to a boule of a desirably large size. There may be relative rotation between the titania-doped silica glass rod and the collection surface. As shown in FIG. 2, the titania-doped silica glass rod 60 may be fed into the furnace 62 along an axis 64 that is offset from the axis of rotation 66 of the collection surface in order to more easily allow the softened glass 68 to fill the refractory cup.

Once a titania-doped silica glass mass of a desired size is formed in the refractory cup, it is cooled to form a titania-doped silica glass boule. The skilled artisan will recognize that it will be desirable to cool the titania-doped silica glass mass slowly to a temperature below its fictive temperature, and that it may be desirable to anneal the boule once it is formed.

The titania-doped silica boule made in the present invention desirably has a low level of striae; for example, $\Delta n_{striae}$ is desirably less than 100 ppm, and $\Delta stress_{striae}$ is desirably less than 0.15 MPa. The titania-doped glass boule also desirably has a high overall homogeneity; for example, the index homogeneity (through the bulk of the boule, and not counting the surfaces that contacted the bait material or the glass liners) is desirably less than 200 ppm. If a low thermal expansion glass material is required, the titania-doped silica glass boule should have a titania content of between about 5 wt % and about 9 wt %, and a coefficient of thermal expansion of between about −30 ppb/° C. and about +30 ppb/° C. at a temperature between 15° C. and 30° C. Desirably, the coefficient of thermal expansion of the titania-doped silica glass boule is between −10 ppb/° C. and about +10 ppb/° C. at a temperature between 15° C. and 30° C. More desirably, the coefficient of thermal expansion of the titania-doped silica glass boule is between −5 ppb/° C. and about +5 ppb/° C. at a temperature between 15° C. and 30° C. In certain embodiments of the invention, the coefficient of thermal expansion of the titania-doped silica glass boule is between −2 ppb/° C. and about +2 ppb/° C. at a temperature between 15° C. and 30° C. The titnaia-doped silica boule desirably has a variation in coefficient of thermal expansion of less than about 5 ppb/° C. at a temperature between 15° C. and 30° C. The boule desirably has a thickness of between about 25 mm and about 1000 mm, and is more desirably greater than 100 mm in thickness. The boule desirably has a diameter of at least about 20 cm, and more desirably greater than about 50 cm.

Depending upon the method by which the titania-doped silica glass rod is made, a single titania-doped silica glass rod may not provide sufficient glass material for the formation of a desirably large titania-doped silica boule. In such a case, it may be desirable to form the titania-doped silica rod by fusing together a plurality of homogeneous titania-doped silica glass bars, each of which is made by a desired method (e.g., sol-gel processing of titania-doped silica soot). Desirably, the method used to fuse together the titania-doped silica glass bars does not form a substantial interface between the bars, since any interfacial structures (e.g., air-filled gaps) in the titania-doped silica rod may be carried into the titania-doped silica glass mass during deposition. One suitable method for fusing titania-doped silica bars into a rod is direct bonding, such as is described in U.S. patent application Ser. Nos. 10/255,926 and 10/035,659, each of which is hereby incorporated herein by reference in its entirety. Optical wringing, flameworking, and other heat fusion methods may also be used by the skilled artisan. Alternatively, titania-doped silica glass rods can be fed into the furnace one at a time. In such a process, each titania-doped silica glass rod (except the first) is held just above the titania-doped silica glass mass in the furnace until its end softens sufficiently to flow into the mass; once flow has begun, the titania-doped silica glass rod can be fed into the furnace as described above.

Another embodiment of the invention relates to a titania-doped silica glass article. The titania-doped silica glass article is made by forming a titania-doped silica boule as described above, then finishing the boule into the titania-doped silica glass article. As the skilled artisan will appreciate, the finishing process may include operations such as cutting, grinding, polishing, embossing, flameworking, etching and coating. The titania-doped silica article may be, for example, a lens, a mirror blank, a photolithography mask, a support structure, a window or a prism.

Another embodiment of the invention relates to a titania-doped silica glass article having low thermal expansion and high homogeneity. The titania-doped silica glass article according to this embodiment of the invention has a titania content of between about 5 wt % and about 9 wt %; a coefficient of thermal expansion of between about −30 ppb/° C. and about +30 ppb/° C. at a temperature between 15° C. and 30° C.; and a variation in coefficient of thermal expansion of less than about 5 ppb/° C. at a temperature between 15° C. and 30° C. Desirably, the absolute value of the coefficient of thermal expansion is less than 10 ppb/° C. at a temperature between 15° C. and 30° C. More desirably, the absolute value of the coefficient of thermal expansion is less than 5 ppb/° C. at a temperature between 15° C. and 30° C. In certain especially desirable embodiments of the invention, the absolute value of the coefficient of thermal expansion is less than 2 ppb/° C. at a temperature between 15° C.

and 30° C. The titanium doped article according to this embodiment of the invention may have at least one dimension larger than 20 cm in length. Desirably, the titania-doped silica glass article has refractive index inhomogeneity of less than 150 ppm. More desirably, the titania-doped silica glass article has a refractive index inhomogeneity of less than 50 ppm. Desirably, the titania-doped silica glass article has a $\Delta n_{striae}$ less than 100 ppm. The titania-doped silica glass article according to this embodiment of the invention may be made, for example, according to the process described hereinabove.

The titania-doped silica powders and glasses used in the present invention may be made to be extremely pure, and have a desired composition. In one embodiment of the present invention, the titania-doped silica materials consist essentially of oxides of titanium and silicon along with a small amount of dissolved water. Alternatively, other species may be included in the titania-doped silica. For example, the titania-doped silica may include small amounts of cerium and/or aluminum. The skilled artisan will determine the desired chemical composition of the titania-doped silica material depending on the end use and requirements of the final silica-doped titania boule or article.

The invention will be further described by the following non-limiting examples.

EXAMPLE 1

Titania-doped silica powder having a titania concentration of about 7 wt % was formed using a flame hydrolysis process as described in [SP02-028]. Titanium tetraisopropoxide and octamethylcyclotetrasiloxane (1:4.5 weight ratio) were injected into a vaporizer at 140° C. with 8 slpm nitrogen as a carrier gas. The precursor stream was carried to two burners, and combusted with 6 slpm oxygen, and 2 slpm methane/oxygen (1:1). Enough prefiltered air to cool the overall temperature to 100° C. was flowed through the furnace. The titania-doped silica powder so formed was collected. The powder had a titania concentration of about 7 wt %, and a surface area of about 25 m²/g.

The titania-doped silica powder was dispersed in aqueous solution to make a series of sols, as detailed in Table 1. Tetramethylammonium hydroxide was dissolved in water, and titania-doped silica powder was added at 50–70 wt % to form a slurry. The slurry was rolled overnight, then tris(2-aminoethyl)amine was added. The slurry was rolled or mixed for a few minutes, then 1-chloro-2-propanol was added. After a few more minutes of mixing, the sol was ready for further processing.

Lengths of glass tubing sealed on one end with plastic film (SARAN wrap) were used as molds. Typically, molds 25 mm in diameter and 200 mm long were used, but molds up to 160 mm in diameter were used with success. The insides of the molds were treated with a long chain alkyltrialkoxysilane (e.g., octadecyltrimethoxysilane) as a release coating. The sols described above were poured into the molds, then degassed (25–35 Torr for 2–5 minutes) to minimize the presence of bubbles. After degassing, the molds were capped with plastic film, and the sols were allowed to gel at room temperature for 15–72 hours. The results of the gelling operation are shown in Table 1. Strong gels were stiff and released well from the mold. Weak gels were more rubbery in character.

TABLE 1

| Sample | TMAH (wt %) | Tris(2-aminoethyl)amine (wt %) | 1-Chloro-2-propanol (wt %) | Wt % powder | Result |
|---|---|---|---|---|---|
| 1 | 2.5 | 1.4 | 2.6 | 55 | Strong gel |
| 2 | 2.5 | 1.4 | 1.3 | 55 | No gel |
| 3 | 2.5 | 0.7 | 2.6 | 55 | Weak gel |
| 4 | 2.5 | 0.7 | 1.3 | 55 | Strong gel |
| 5 | 1.3 | 1.4 | 2.6 | 55 | Strong gel |
| 6 | 1.3 | 1.4 | 1.3 | 55 | No gel |
| 7 | 1.3 | 0.7 | 2.6 | 55 | Strong gel |
| 8 | 1.3 | 0.7 | 1.3 | 55 | Weak gel |
| 9 | 2 | 1.3 | 2.4 | 60 | Strong gel |
| 10 | 1.6 | 1.2 | 2.2 | 65 | Strong gel |
| 11 | 1.4 | 1.1 | 2.1 | 70 | Strong gel |

The gels were demolded and placed in glass sleeves that were slightly larger in diameter and length than the gel. The sleeves provide maximal support of the somewhat fragile gel, which minimizes stress in the final rod, as well as serve to maintain high relative humidity during the initial drying. The gels were allowed to dry overnight at room temperature, then heated at 120° C. for 24 hours. The dried gels were heated slowly to 700–800° C. in air to remove organics, leaving powder preforms having a density of about 1.2 g/cm³ and a pore size distribution of 0.02–0.07 µm, centered at 0.04 µm.

A powder preform (sample 7) was heated at 800° C. in flowing helium for 10 minutes. The sample was heated at 2° C./min to 1410° C. in helium, and held at that temperature for 10 minutes. The sample was then heated at 2° C./min at 1670° C. in air and held for 10 minutes, forming a homogenous titania-doped silica rod having a variation in coefficient of thermal expansion less than 2 ppb/K. This titania-doped silica rod is suitable for use in the boule forming processes of the present invention.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:
1. A method of producing a titania-doped silica glass boule, the method comprising the steps of:
   providing a substantially homogeneous titania-doped silica glass rod, the titania-doped silica glass rod having a titania content of between about 1 and about 10 wt %, the titania-doped silica glass rod being substantially non-porous;
   feeding the titania-doped silica glass rod into a furnace, the furnace having a glass collection surface therein, wherein the titania-doped silica glass rod is softened in the furnace to form a softened titania-doped silica glass, and the softened titania-doped silica glass is deposited on the collection surface, thereby forming a softened titania-doped silica glass mass; and cooling the titania-doped silica glass mass to produce the titania-doped silica glass boule.

2. The method of claim 1, wherein the substantially homogeneous titania-doped silica glass rod has a $\Delta n_{striae}$ less than about 100 ppm.

3. The method of claim 1, wherein the substantially homogeneous titania-doped silica glass rod has an index inhomogeneity of less than 200 ppm.

4. The method of claim 1, wherein the substantially homogeneous titania-doped silica glass rod has a titania content of between about 5 wt % and about 9 wt %; and a coefficient of thermal expansion of between about −30 ppb/° C. and about +30 ppb/° C. at a temperature between 15° C. and 30° C.

5. The method of claim 1, wherein the titania-doped silica boule has a $\Delta n_{striae}$ less than about 100 ppm.

6. The method of claim 1, wherein the titania-doped silica glass boule has a titania content of between about 5 wt % and about 9 wt %; and a coefficient of thermal expansion of between about −30 ppb/° C. and about +30 ppb/° C. at a temperature between 15° C. and 30° C.

7. The method of claim 1, wherein the step of providing the substantially homogeneous titania-doped silica glass rod comprises the steps of:
providing a titania-doped silica powder;
forming a porous titania-doped silica body from the titania-doped silica powder; and
heating the porous titania-doped silica body to form the titania-doped silica glass rod.

8. The method of claim 7 wherein the porous titania-doped silica glass body has a median pore size of less than about 20 microns.

9. The method of claim 1, wherein the step of providing the substantially homogeneous titania-doped silica glass rod comprises the steps of:
forming a titania-doped silica sol;
causing the sol to gel, thereby forming a titania-doped silica gel;
drying the titania-doped silica gel to form a porous titania-doped silica body; and
heating the porous titania-doped silica body to form the porous titania-doped silica glass rod.

10. The method of claim 9, wherein the step of forming the titania-doped silica sol comprises the steps of
providing a titania-doped silica powder; and
dispersing the titania-doped silica powder in a liquid phase, thereby forming the titania-doped silica sol.

11. The method of claim 1, wherein the step of providing the substantially homogeneous titania-doped silica glass rod comprises the steps of:
providing a titania-doped silica glass soot;
spray-drying the soot to form an agglomerate;
dry-pressing the agglomerate to form a porous titania-doped silica body; and
heating the titania-doped silica body to form the titania-doped silica glass rod.

12. The method of claim 1, wherein the homogeneous titania-doped silica glass rod is formed from a titania-doped silica powder having surface area between about 10 m²/g and about 200 m²/g.

13. The method of claim 1, wherein the step of providing the homogeneous titania-doped silica glass rod includes the steps of:
providing a first homogeneous titania-doped silica glass bar and a second homogeneous titania-doped silica glass bar; and
fusing the first homogeneous titania-doped silica glass bar to the second homogeneous titania-doped silica glass bar without forming a substantial interface therebetween.

14. The method of claim 1 wherein during the step of feeding the titania-doped silica glass rod into the furnace, there is relative rotation between the titania-doped silica glass rod and the collection surface.

15. The method of claim 1, wherein the diameter of the titania-doped silica glass boule is more than three times the diameter of the titania-doped silica glass rod.

16. The method of claim 1, wherein the thickness of the titania-doped silica glass boule is at least about 100 mm.

17. The method of claim 1, wherein during the step of feeding the titania-doped silica glass rod into the furnace, the furnace has a non-reducing atmosphere.

18. A method of producing a titania-doped silica glass article, the method comprising the steps of:
forming a titania-doped silica glass boule using the method of claim 1; and
finishing the titania-doped silica glass boule into the titania-doped silica glass article.

19. The titania-doped silica glass article made by the method of claim 18.

* * * * *